United States Patent

[11] 3,554,380

[72] Inventors Susanna Mikhailovna Karpacheva,
2 Schukinsky proezd, 2, kv. 88;
Jury Georgievich Karkhachev, 7 ulitsa oktyabrskogo Polya, 5, kv. 6; Valerian Matveevich Muratov, Astakhovsky pere..lsk, 1/2, kv. 118; Leonid Solomonovich Raginsky, Nikitinskaya ulitsa, 16, korpus 1, kv. 29, Moscow, U.S.S.R.
[21] Appl. No. 711,101
[22] Filed Mar. 6, 1968
[45] Patented Jan. 12, 1971
[32] Priority Mar. 10, 1967
[33] U.S.S.R.
[31] 1,137,933

[54] DEVICE FOR PREPARING THICK PULP
4 Claims, 1 Drawing Fig.
[52] U.S. Cl. .................................................. 210/412, 210/19
[51] Int. Cl. .................................................. B01d 35/20
[50] Field of Search ........................................... 210/19, 388, 412

[56] References Cited
UNITED STATES PATENTS
3,389,797  6/1968  Giardini .................... 210/412X Primary Examiner—Samih N. Zaharna
Attorney—Waters, Roditi, Schwartz & Nissen ABSTRACT: A device is provided for preparing thick pulp including a tank supplied from above with suspension and containing a submerged filter element therein. The filter element communicates with a pulsation chamber which receives filtered liquid, and a vertical discharge pipe is connected to the pulsation chamber and has an expanded discharge chamber at its end remote from the pulsation chamber at a level thereabove. A pulsation is connected to the pulsation chamber for producing periodic pressure pulses to discharge filtered liquid from the discharge chamber and to force filtered liquid in the pulsation chamber back through the filter element.

PATENTED JAN 12 1971 3,554,380
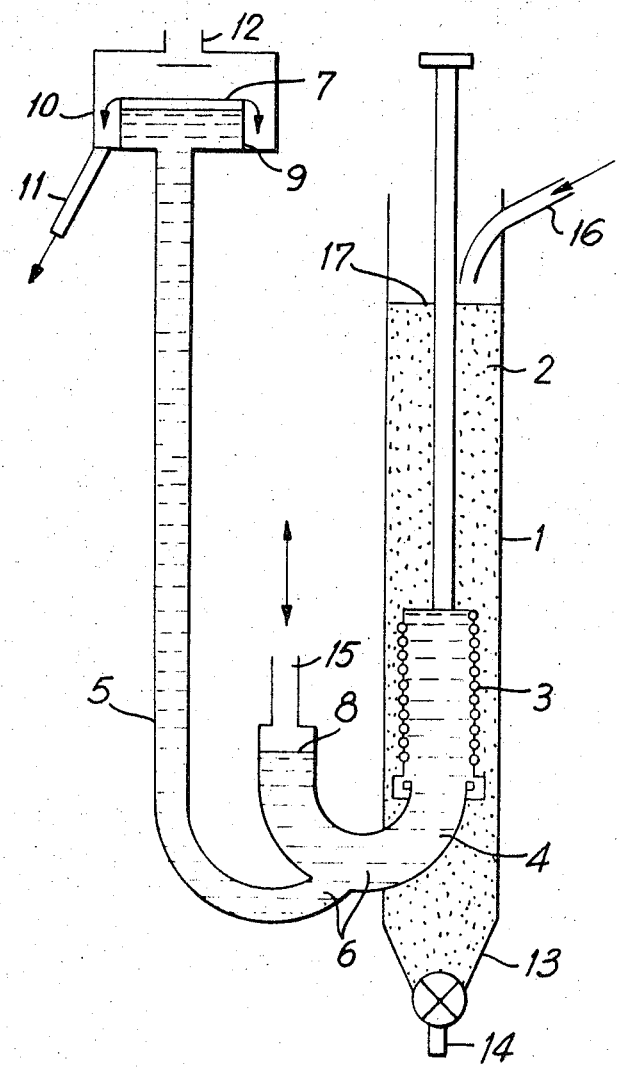

DEVICE FOR PREPARING THICK PULP

The present invention relates to apparatus for filtering suspensions and, more particularly, to devices for preparing thick pulp.

The present invention can be most successfully used for separating toxic products, when the equipment attendance is accompanied with difficulties.

Known in the art are devices for preparing thick pulp, comprising a tank for suspension, and filtering elements and a pulsation chamber mounted in said tank.

When used for separating suspensions comprising a considerable amount of fine particles, the known devices have a low specific efficiency, since it is mainly the surface of the filtering element that is regenerated, and the fine particles can scarcely be washed out from the pores of said element.

Additionally, the known devices are disadvantageous in that a change in the amount of particles caught by the filtering element, necessitates a high-precision control over the pulsation pressure, which requires the employment of special instruments and, thus, results in higher cost of the process.

It is an object of the present invention to provide a device for preparing thick pulp, insuring continuous cleaning of pores of the filtering element directly in the course of the process of separation of solid particles from liquid.

Another object of the invention is to provide a device for preparing thick pulp, in which a change in the amount of the particles caught by the filtering element will not require pulsation pressure variation.

Still another object of the invention is to provide a device for preparing thick pulp, which is simple in design and reliable in operation.

These and other objects of the invention are accomplished by the employment of a device for preparing thick pulp, in which liquid, separated from suspension supplied into the tank, flows through a filtering element disposed in the tank and is delivered into the pulsation chamber which, in accordance with the invention, is provided with a pipe used for draining filtered liquid and having an expanded drain chamber arranged at the end thereof and above the pulsation chamber portion to be filled with filtered liquid.

It is expedient to dispose the above pipe vertically and to fashion the lower portion thereof as a bend used to connect said pipe to the pulsation chamber.

The present device provides for a three- to ten-time increase of the specific efficiency; for instance, when filtering boron carbide suspension with a volumetric correlation of solid particles and liquid equaling one-thirtieth to one-fiftieth, the specific efficiency of the known device was $0.08 - 0.16$ m.$^3$/m.$^2$ per hr., whereas that of the present device is $0.3 - 2.0$ m.$^3$/m.$^2$ per hour. Additionally, the proposed device is simpler in design and more reliable in operation, since for the faultless operation it requires that pressure supplied to the pulsator only be stabilized and not controlled.

To make the present invention readily understood, the following description of a specific embodiment thereof is given with reference to the accompanying drawing, the sole FIG. of which shows a diagrammatic front view of a device for preparing thick pulp.

The device for preparing thick pulp comprises a tank 1 for a suspension 2 delivered thereinto, a filtering element 3 being disposed in said tank 1 and communicating with a pulsation chamber 4 in turn connected to a pipe 5.

Pipe 5 is used for draining filtered liquid 6 and is connected to the pulsation chamber portion so as to be filled with liquid, the end of pipe 5 being disposed above the pulsation chamber. This arrangement of pipe 5 provides for a difference between drain level 7 of filtered liquid and level 8 in the pulsation chamber, said difference being maintained by means of constant pulsation pressure supplied into pulsation chamber 4 and simultaneously used for cleaning the pores of filtering element 3. Pipe 5 has an expanded drain chamber 9 arranged at the end thereof and provides for a practically constant position of drain level 7 of filtered liquid in spite of periodic changes in the magnitude and direction of the speed of the filtered liquid pulsating inside pipe 5. Chamber 9 is disposed in a housing 10 having a drain connection 11 and a port 12 connecting the inner space of housing 10 with the atmosphere.

Pipe 5 is disposed vertically and its lower portion is fashioned as a bend intended to connect the pipe with the pulsation chamber. However, the pipe may be inclined and have several bends, provided its drain chamber 9 is disposed above the pulsation chamber portion to be filled with filtered liquid.

Tank 1 is made as a column, but may be of any other shape, provided it can house filtering elements and insure a complete submergence thereof in suspension. The lower portion of tank 1 is conical at 13 for accumulating thick pulp and portion 13 is provided with an outlet branch pipe 14.

Pulsation chamber 4, designed for transmitting air pulses to the filtered liquid, has a pipe union 15 for connection with a pulsator diagrammatically illustrated by the line with arrows, and communicates inside the tank with one or several filtering elements. Pulsation chamber 4 extends outside the tank, however it may be entirely arranged inside the latter, as well, and communicate with filtering elements either directly, or via intermediate spaces.

Filtering element 3 is essentially a changeable sleeve which may be of any shape and has pores whose size determines the allowable size of particles carried away by the filtered out liquid.

The device operates as follows.

Suspension is continuously supplied by gravity into tank 1 through pipe union 16, and its level 17 is raised to an arbitrary height. Under the action of the static difference, liquid penetrates through the pores of filtering element 3 inside pulsation chamber 4. With the pulsation chamber filled up with the filtered liquid, the pulsator is actuated and compressed air pulses are produced in alternation with vacuum or atmospheric pressure pulses in the pulsation chamber via pipe union 15. When pressure pulse is produced inside the pulsation chamber, the main bulk of the filtered liquid is delivered into pipe 5, fills the same and is then partially drained, some portion of the liquid being simultaneously delivered into tank 1 through the pores of the filtering element, to remove the sediment from the outer surface of the filtering element. When the air is exhausted from the pulsation chamber, the pressure therein equals that of the atmosphere, and under the action of the static difference the liquid leaks into pulsation chamber 4, simultaneously from tank 1 (through filtering element 3) and from pipe 5, thus making provision for the level in chamber 4 to come back to its initial position. Thereupon, the cycle is repeated.

Thus, the proposed device provides for continuous separation of suspension and preparation of thick pulp together with continuous cleaning of the pores and surface of the filtering element, and the device operates at a constant pulsation pressure without requiring special control thereof, and is simple in design and reliable in operation.

We claim:

1. A device for preparing thick pulp, comprising: a tank for suspension supplied thereinto; a filtering element submerged for filtering the suspension therein in said tank; a pulsation chamber communicating with said filtering element for receiving liquid filtered through said filtering element; a pipe connected to said pulsation chamber for draining from said pulsation chamber filtered liquid; an expanded drain chamber arranged at the end of said pipe remote from the pulsation chamber, said drain chamber being disposed above the portion of the pulsation chamber to be filled with filtered liquid; and means for applying periodic pressure pulses in the pulsation chamber to expel liquid from the drain chamber and to force filtered liquid back through the filtering element.

2. A device according to claim 1, wherein the pipe for draining filtered liquid is disposed vertically and has a lower bend portion connecting the pipe to the pulsation chamber.

3. A device according to claim 1, wherein said tank is vertical and has a lower portion beneath said filtering element with an outlet therein.

4. A device according to claim 3, wherein said lower portion includes a conical portion.